United States Patent
Brown et al.

(10) Patent No.: US 9,733,475 B1
(45) Date of Patent: Aug. 15, 2017

(54) CURVED WAVEGUIDE COMBINER FOR HEAD-MOUNTED AND HELMET-MOUNTED DISPLAYS (HMDS), A COLLIMATED VIRTUAL WINDOW, OR A HEAD UP DISPLAY (HUD)

(71) Applicants: Robert D. Brown, Lake Oswego, OR (US); James H. Stanley, Palo Alto, CA (US)

(72) Inventors: Robert D. Brown, Lake Oswego, OR (US); James H. Stanley, Palo Alto, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 73 days.

(21) Appl. No.: 14/479,677

(22) Filed: Sep. 8, 2014

(51) Int. Cl.
*G02B 27/01* (2006.01)
*G02B 27/10* (2006.01)

(52) U.S. Cl.
CPC ..... *G02B 27/0101* (2013.01); *G02B 27/0172* (2013.01); *G02B 27/1086* (2013.01); *G02B 2027/013* (2013.01)

(58) Field of Classification Search
CPC ............ G02B 27/0101; G02B 27/0172; G02B 27/1086; G02B 2027/011; G02B 2027/0129; G02B 2027/013; G02B 2027/0132; G02B 2027/0134; G02B 2027/0174

USPC ...... 359/567, 650, 651, 633, 13, 14; 349/11, 349/13; 353/28
See application file for complete search history.

(56) References Cited

U.S. PATENT DOCUMENTS

| | | | |
|---|---|---|---|
| 4,309,070 A | 1/1982 | St. Leger Searle | |
| 4,711,512 A | 12/1987 | Upatnieks | |
| 8,634,139 B1 | 1/2014 | Brown et al. | |
| 8,659,826 B1 | 2/2014 | Brown et al. | |
| 8,749,890 B1 | 6/2014 | Wood et al. | |
| 8,830,584 B2 | 9/2014 | Saarikko et al. | |
| 2004/0246391 A1* | 12/2004 | Travis | G02B 27/0081 349/6 |
| 2010/0157400 A1* | 6/2010 | Dimov | G02B 5/188 359/13 |
| 2012/0162549 A1* | 6/2012 | Gao | G02B 27/0172 349/11 |

\* cited by examiner

*Primary Examiner* — Thomas K Pham
*Assistant Examiner* — Marin Pichler
(74) *Attorney, Agent, or Firm* — Donna P. Suchy; Daniel M. Barbieri

(57) ABSTRACT

A head mounted or helmet mounted display (HMD), head up display (HUD, or collimated virtual window can be used in various applications including but not limited to avionic applications. The HMD, HUD, or collimated virtual window can include a cylindrical, elliptical, or curved substrate waveguide combiner. The cylindrical or curved substrate waveguide combiner can be used with a projector which provides pre-aberrated light. The cylindrical substrate waveguide combiner provides collimated light to a user with reduced wavefront errors.

20 Claims, 5 Drawing Sheets

CURVED WAVEGUIDE COMBINER FOR HEAD-MOUNTED AND HELMET-MOUNTED DISPLAYS (HMDS), A COLLIMATED VIRTUAL WINDOW, OR A HEAD UP DISPLAY (HUD)

BACKGROUND OF THE INVENTION

The present specification relates to displays. More particularly, the present specification relates to head-mounted and helmet-mounted displays (HMDs), a collimated virtual window, or head up display (HUD). Head mounted displays are also referred to as head worn displays (HWDs or simply HDs).

HUDs and HMDs provide significant safety and operational benefits. In avionic applications, HUDs and HMDs can provide the pilot with flight information and enhanced situational awareness in degraded visual environments. These operational and safety benefits can be important to operators of air transport aircraft, regional aircraft, high end business jets, smaller private aircraft, and military aircraft. In the case of military aircraft, HUDs and HMDs can also provide pilots with mission-critical information and targeting cues.

Substrate guided displays which use waveguide technology with diffraction gratings to preserve eye box size while reducing size of the projection optics have been proposed. U.S. Pat. No. 4,309,070 issued St. Leger Searle and U.S. Pat. No. 4,711,512 issued to Upatnieks disclose substrate waveguide head-up displays (HUDs). U.S. Pat. Nos. 8,749,890, 8,634,139, and 8,659,826, all incorporated herein by reference and assigned to the assignee of the present application, also disclose waveguide displays (including but not limited to HUDs and HMDs for use in cockpit and other environments.

There is a need for a HMD or HUD with a curved combiner. Further, there is a need for a HMD or HUD which uses a curved substrate waveguide combiner. There is a need for a HMD or HUD with a curved combiner which is lightweight and esthetically attractive. Yet further, there is a need for a collimating projector for a curved substrate waveguide HMD or HUD with acceptable wavefront errors. Still further, there is a need for curved waveguide combiner for a helmet, goggles or glasses that creates a collimated image with acceptable wavefront errors. Still further, there is a need for curved waveguide combiner for a collimated virtual window.

SUMMARY

An exemplary embodiment relates to a head-mounted or helmet-mounted (HMD) display for use with an image source. The HMD includes an asymmetric projector and a curved substrate waveguide. Light from the projector enters the curved substrate waveguide and is ejected from the curved substrate waveguide via a suitable mechanism toward a user. After bouncing between surfaces of the curved substrate waveguide, the light is ejected as collimated light. The light is pre-aberrated to reduce wavefront errors due to the curved shape of the curved substrate waveguide. The curved substrate waveguide can be a cylindrical, elliptical or other curved waveguide in one or more embodiments.

Another exemplary embodiment relates to a method of providing information to a user. The method includes providing pre-aberrated light to a curved substrate waveguide combiner and providing said pre-aberrated light from an input of the curved substrate waveguide combiner to an output of the curved substrate waveguide combiner. The method also includes ejecting light from the curved substrate waveguide combiner at the output as collimated light with reduced wavefront error due to the use of the pre-aberrated light.

Another exemplary embodiment relates to a head up display (HUD), collimated virtual window or head-mounted or helmet-mounted display (HMD). The HUD, collimated virtual window, or HMD includes an asymmetric optical system and a curved waveguide combiner having an input mechanism and an output mechanism. Light travels by total internal reflection from a top to a bottom of the curved waveguide combiner in a direction parallel to a single axis. The curved waveguide combiner is curved about the single axis. The asymmetric optical system is pre-aberrated to reduce wavefront errors associated with the curved waveguide combiner.

BRIEF DESCRIPTION OF THE DRAWINGS

Exemplary embodiments are hereafter described with reference to the accompanying drawings, wherein like numerals denote like elements; and.

DETAILED DESCRIPTION OF THE PREFERRED EMBODIMENTS

Figure 1:
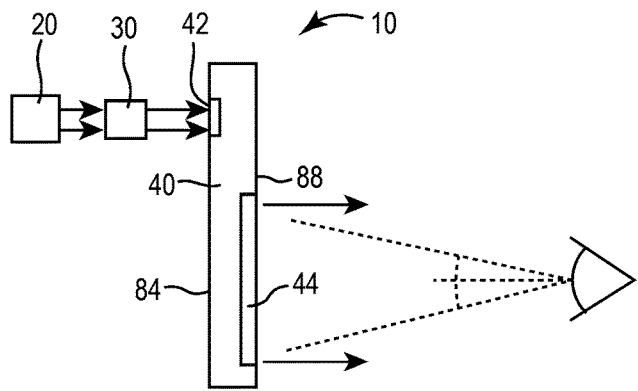
FIG. 1 is a general block diagram of head-mounted or helmet-mounted display (HMD) system including a curved substrate waveguide combiner in accordance with an exemplary embodiment.

Before describing in detail the particular improved system and method, it should be observed that the invention includes, but is not limited to, a novel structural combination of optical components and not in the particular detailed configurations thereof. Accordingly, the structure, methods, functions, control and arrangement of components have been illustrated in the drawings by readily understandable block representations and schematic drawings, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Exemplary embodiments provide display systems and display methods using a curved substrate waveguide combiner. In one embodiment, the curved substrate waveguide combiner is a waveguide for use in HMDs, HUDs or collimated virtual windows. In one embodiment, the waveguide can be provided as a curved plastic visor or curved glass substrate (e.g. sunglass lens) for HMDs. In one embodiment, a projector with pre-aberration reduces issues with curved combiners, such as, out of focus output beam issues, out of collimation output beam issues, or other unwanted effects. In another embodiment, the combiner is used as a vehicle windshield, such as an aircraft windshield. The use of a curved waveguide allows the display system to be integrated into various existing form factors according to various embodiments. Although cylindrical waveguides are discussed herein, embodiments include other types of curved waveguides including elliptical waveguides.

Applicants have found that the wavefront error (i.e.; loss of collimation) builds up with distance of light travel along a cylindrical waveguide or a waveguide curved about a single axis. Applicants have found that the wavefront error builds up linearly in a waveguide curved about a single axis along the direction of light traveling by total internal reflection in the waveguide (e.g., the wavefront error increases as the pupil is expanded as light travels down the waveguide). Applicants have also found that the wavefront error or aberration has an off axis asymmetric twist (e.g. like potato chip). In one embodiment, system and methods utilize a projector which pre-aberrates the pupil to reduce said wavefront error.

With reference to FIG. 1, a head-mounted or helmet-mounted display (HMD) system 10 can be utilized in various applications, including aviation, medical, naval, targeting, ground based, military, entertainment, etc. HMD system 10 can be configured to provide an appropriate field of view and eye box for avionic and worn display applications. Although aircraft applications are discussed below, exemplary embodiments of HMD system 10 are not limited to aircraft applications. In one embodiment, HMD system 10 is a HUD or collimated virtual window. A collimated virtual window can be used to provide virtual views in environments where conventional windows are not available or desired or to provide a simulated window in simulator environments.

HMD system 10 includes an image source 20, collimating optics capable of pre-aberrating the image 30, and a curved substrate waveguide combiner 40 in one embodiment. Curved substrate waveguide combiner 40 introduces wavefront error which is alleviated by pre-aberration using optics 30 in one embodiment. The pre-aberration can be across the vertical and horizontal fields of view in one embodiment.

Image source 20 can be any device for providing an image including but not limited to a CRT display, an LED display, an active matrix liquid crystal display (LCD), a laser, a liquid crystal on silicon (LCOS) display, an organic LED (OLED), a Quantum Photonic Imagers, etc. In a preferred embodiment, image source 20 is a micro LCD assembly with an associated backlight unit.

Optics 30 can be disposed between curved substrate waveguide combiner 40 and image source 20 in one embodiment. Optics 30 can be a single optical component, such as a lens, or include multiple optical components (e.g., mirrors, prisms, lenses, wave plates, polarizers, filters, beam splitters, etc.) In one embodiment, optics 30 are configured so that light is pre-aberrated in such a way that the curved substrate waveguide combiner 40 provides collimated or near collimated light to the user.

Optics 30 can be any optical component or configuration of optical components that provide pre-aberrated light in one embodiment. In one embodiment, optics 30 project pre-conditioned light to curved substrate waveguide combiner 40 which outputs the light as collimated light to a user. The pre-conditioned light has an optical characteristic which is the inverse of the optical characteristic of curved substrate waveguide combiner 40 in one embodiment. Optics 30 can be integrated with or spaced apart from image source 20 and/or curved substrate waveguide combiner 40.

In one embodiment, optics 30 project light to a center top portion of curved substrate waveguide combiner 40. Optics 30 can be disposed at a center top portion of curved substrate waveguide combiner 40 in one embodiment (as opposed to side mounted). A light pipe, waveguide, or other optics can be used to provide light from optics 30 to a center top input if optics 30 cannot be situated at the center top of curved substrate waveguide combiner 40 in one embodiment.

In operation, HMD system 10 provides images from image source 20 to a pilot or other operator so that the pilot or operator can simultaneously view the images and a real world scene. The images can include graphic and/or text information (e.g., flight path vector, indicators, and icons) related to avionic information in one embodiment. In addition, the images can include synthetic and/or enhanced vision images. In one embodiment, collimated light representing the image from image source 20 is provided on curved substrate waveguide combiner 40 so that the pilot or operator can view the image conformally on the real world scene through curved substrate waveguide combiner 40. Curved substitute waveguide combiner 40 can be translucent or transparent for viewing the real world scene through main surfaces or sides 84 and 88.

In one embodiment, curved substrate waveguide combiner 40 includes an input diffraction grating 42 and an output diffraction grating 44. Gratings 42 and 44 can be gradient coupling gratings that provide excellent image quality and acceptable brightness in one preferred embodiment. Gratings 42 and 44 can be implemented as holographic gratings, Bragg gratings, surface relief gratings, etc. Gratings 42 and 44 can be implemented according to a number of techniques.

Alternatively, gratings 42 and 44 can be other types of optical couplers for coupling light into and out of curved substrate waveguide combiner 40. For example, gratings 42 and/or 44 can be replaced by injection and ejection optical elements. For example, optics 30 or curved substrate waveguide combiner 40 can include reflective surfaces, prisms, mirrors, or other devices for injecting light to and ejecting light from curved substance waveguide combiner 40.

Curved substrate waveguide combiner 40 can be a single glass plate or plastic film. In one embodiment, curved substrate waveguide combiner 40 can be formed of a rigid material or can be formed of a flexible material held in place by a frame or a bracket. In one embodiment, the material for curved substrate waveguide combiner 40 can be rolled glass which can be laid over a mandrel and bent to the appropriate shape as long as the radius of curvature is not too severe. Curved substrate waveguide combiner 40 can have a variety of shapes including generally rectangular, oval, circular, tear drop-shaped, hexagonal, rectangular with rounded corners, square-shaped, etc.

In operation, curved substrate waveguide combiner 40 advantageously receives linearly polarized light associated with an image from image source 20 at an input (e.g., grating 42) and provides collimated light to a user at its output (e.g., grating 44). Image source 20 provides information using a single color of light (e.g., a single wavelength approximately between 525 and 550 nanometers (nm)) in one embodiment. Light provided to curved substrate waveguide combiner 40 is linearly polarized and pre-aberrated in accordance with the inverse of characteristics of curved substrate waveguide combiner 40. Alternatively, other polarization, multiple colors, or other colors at different wavelengths can be utilized without departing from the scope of the invention.

Curved substrate waveguide combiner 40 performs three operations in a one embodiment. First, curved substrate waveguide combiner 40 is disposed to provide a medium for transporting light by total internal reflection from its input to its output in one embodiment. Light is reflected (e.g., bounces) multiple times off of opposing main sides 84 and 88 of curved substrate waveguide combiner 40 as it travels in one embodiment. Second, by gradually ejecting light from the substrate waveguide combiner 40, the exit pupil is expanded with respect to the input pupil. Third, curved substrate waveguide combiner 40 operates as a combiner allowing the user to view the light from image source 20 at its output and light from the real world scene through main sides 84 and 88 in one embodiment.

Light from optics 30 first strikes diffraction grating 42 at an input on side 84 of curved substrate waveguide combiner 40. Grating 42 diffracts light down the length of curved substrate waveguide combiner 40 so that it travels by total internal reflection to the output on side 88. Diffraction grating 44 diffracts the light toward the user and out of the curved substrate waveguide combiner 40. Diffraction grating 42 has a greater efficiency than diffraction grating 44. According to one embodiment, grating 42 has an efficiency of as high as possible (e.g., 50 percent or greater) and grating 44 has an efficiency low enough to provide a uniform image across the output of curved substrate waveguide combiner.

Diffraction gratings 42 and 44 can be disposed in respective areas that are rectangular in shape and have the same width as each other in one embodiment. Alternatively, gratings 42 and 44 can have different widths and shapes (e.g., trapezoidal). Grating 44 has a greater height than grating 42 in one embodiment.

In one embodiment, HMD system 10 is configured to expand the pupil of system 10 in a single axis (e.g., in the vertical direction). In one embodiment, curved substrate waveguide combiner 40 provides an approximately 3 mm exit pupil. Curved substrate waveguide combiner 40 can affect the single axis pupil expansion via grating 44 in one embodiment. Various orders of pupil expansion and pupil sizes are possible depending upon performance criteria, design parameters, and optical components utilized without departing from the scope of the invention.

Figure 2:
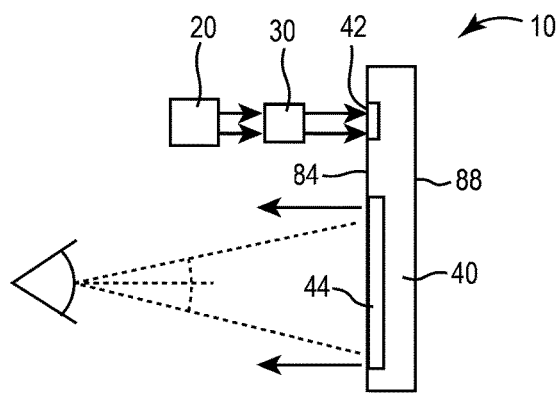
FIG. 2 is a general block diagram of a HMD system including a curved substrate waveguide combiner in accordance with another exemplary embodiment.

With reference to FIG. 1, diffraction gratings 42 and 44 are disposed on respective opposing sides 84 and 88 of curved substrate waveguide combiner 40 in one embodiment. With reference to FIG. 2, gratings 42 and 44 can also be formed on the same side 84 of curved substrate waveguide combiner 40 in one alternative embodiment.

Figure 3:
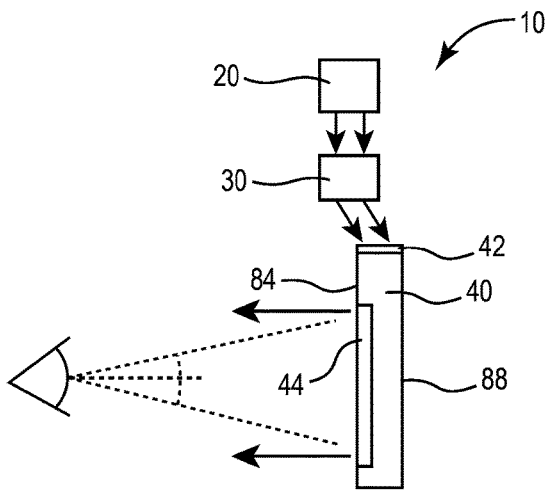
FIG. 3 is a general block diagram of a HMD system including a curved substrate waveguide combiner in accordance with yet another exemplary embodiment.

With reference to FIG. 3, light from optics 30 can be injected into an edge 32 of curved substrate waveguide combiner 40 according to one embodiment. In one embodiment, an input grating 42 is not utilized to inject light into curved substrate waveguide combiner 40. Instead, light is injected at an angle with respect to edge 32 such that light travels down curved substrate waveguide combiner 40 via total internal reflection. Various techniques can be utilized to provide injection at the appropriate angle for total internal reflection. For example, prisms, reflecting surfaces, mirrors, etc. can be used to inject light at the appropriate angle. In one embodiment, light can be ejected from curved substrate waveguide at output grating 44. Alternatively, ejection can be achieved by reflecting surfaces, mirrors, prisms, etc.

Figure 4:
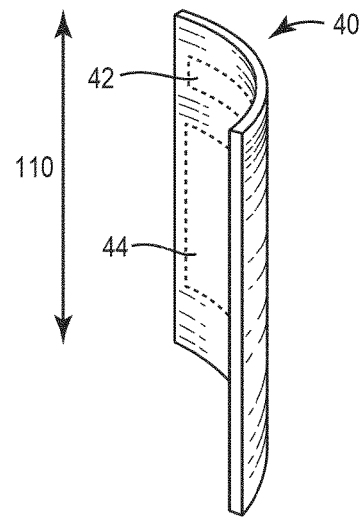
FIG. 4 is a perspective view schematic drawing of an embodiment of the curved substrate waveguide combiner illustrated in FIGS. 1-3 in accordance with still another exemplary embodiment.

With reference to FIG. 4, a single glass plate of inorganic glass material or a sheet of plastic material can utilized for curved substrate waveguide combiner 40. The thickness of glass material is dependent upon field of view and parameters associated with optics 30. Curved substrate waveguide combiner 40 can include gratings 42 and 44, be provided only with grating 44, or provided without gratings 42 and 44 in certain embodiments. In one embodiment, grating 42 is not required and a prism can be utilized to provide a 60 degree injection path into curved substrate waveguide combiner 40 to cause light to travel by total internal reflection between main sides 84 and 88. In one embodiment, an out coupling prism can be utilized instead of grating 44 for ejection of light from curved substrate waveguide combiner 40.

In one or more embodiments, curved substrate waveguide combiner 40 is cylindrically-shaped (e.g., curved about a single axis such as axis 110) or elliptically-shaped. In one embodiment, a concave side of curved substrate waveguide combiner 40 has a radius of curvature of approximately 100 millimeters. In one embodiment, substrate waveguide combiner is approximately 2 millimeters thick. In one embodiment, the convex side of substrate waveguide combiner 40 has a radius of curvature of 102 millimeters and light is ejected toward the user from the concave side.

Figure 5:
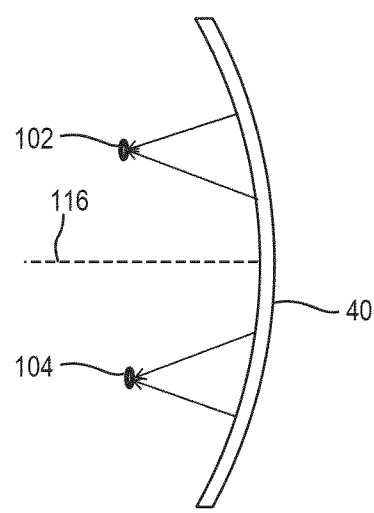
FIG. 5 is a top view schematic drawing of the curved substrate waveguide combiner illustrated in FIG. 4 in accordance with another exemplary embodiment.

With reference to FIG. 5, eye positions 102 and 104 are shown in an exemplary fashion for curved substrate waveguide combiner 40. An axis 116 of symmetry of curved substrate waveguide combiner 40 is located between eye positions 102 and 104.

Figure 6:
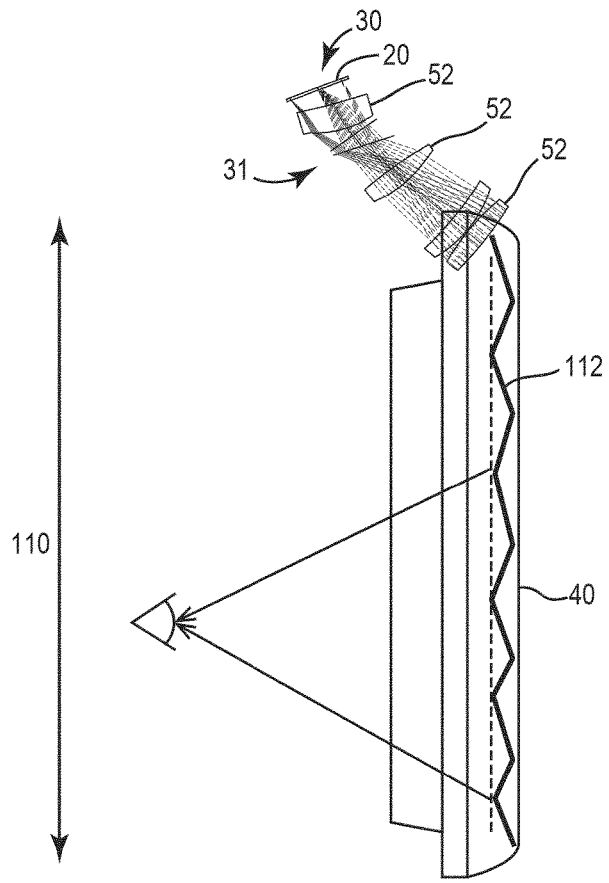
FIG. 6 is a perspective schematic drawing of the curved substrate waveguide combiner illustrated in FIG. 4 with an asymmetric projector and showing a total internal reflection path in accordance with another exemplary embodiment.

With reference to FIG. 6, light 112 from optics 30 travels in a direction parallel to axis 110 down curved substrate waveguide combiner 40. Center axis 116 is perpendicular to the direction of travel of light 112 at the center of curved substrate waveguide combiner 40. As light 112 travels down curved substrate waveguide combiner 40, the number of bounces increases in one embodiment.

Optics 30 can be an assembly 31 disposed adjacent to image source 20 in accordance with on embodiment. Assembly 31 of optics 30 can include at least one anamorphic lens 52. Anamorphic lens 52 provides pre-aberration to correct wavefront errors due to the characteristics of curved substrate waveguide combiner 40.

In one embodiment, the pre-aberration is both in the vertical and horizontal field of view. The wavefront errors for curved substrate waveguide combiner 40 can be characterized to determine the appropriate pre-aberration by optics 30. Various polynomial functions can be characterize the appropriate pre-aberration. Modeling for the design of optics 30 can balance trade-offs between design space, radius of curvature, waveguide thickness, pupil size, eye relief, etc.

Figure 7:
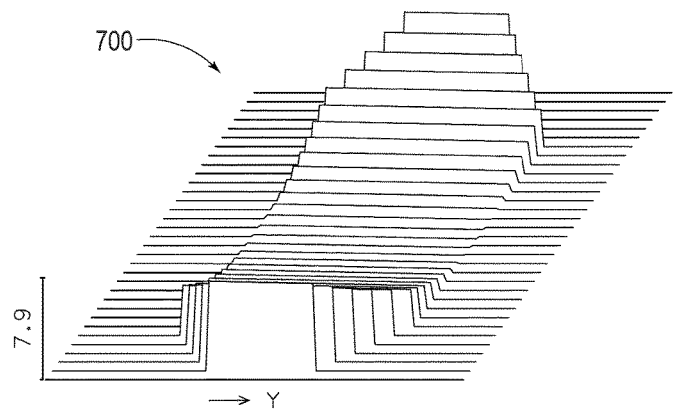
FIG. 7 is a chart showing wavefront error along a center axis for an embodiment of the curved substrate waveguide combiner illustrated in FIGS. 1-3 in accordance with another exemplary embodiment.

With reference to FIG. 7, a chart 700 shows wavefront errors along an axis parallel to the axis of the curved substrate waveguide combiner 40 after 20 bounces down said curved substrate waveguide combiner in one embodiment. As shown in chart 700, the maximum wavefront error down curved substrate waveguide combiner is 7.9 waves. The root mean square (RMS) average is 2.0 waves.

Figure 8:
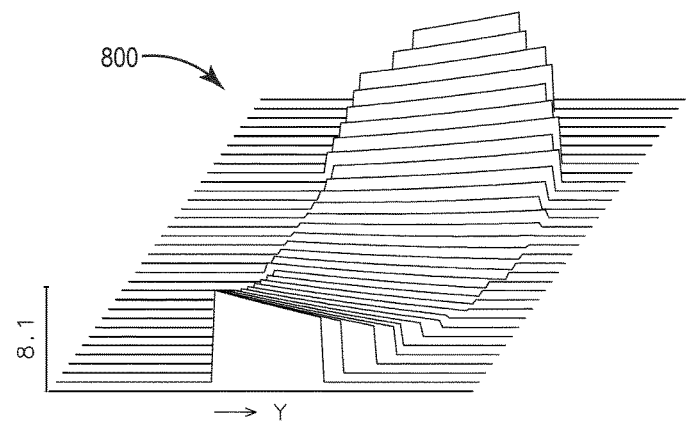
FIG. 8 is a chart showing wavefront error along an axis at an angle with respect to that shown in FIG. 7 for an embodiment of the curved substrate waveguide combiner illustrated in FIGS. 1-3 in accordance with another exemplary embodiment.

With reference to FIG. 8, a chart 800 shows wavefront errors along a ray at an angle of 10 degrees with respect to the central ray shown in FIG. 7. As shown in chart 800, the wavefront errors are asymmetrical for and after eighteen bounces the maximum wavefront error is 8.1 waves. The RMS average is 1.9 waves.

Figure 9:
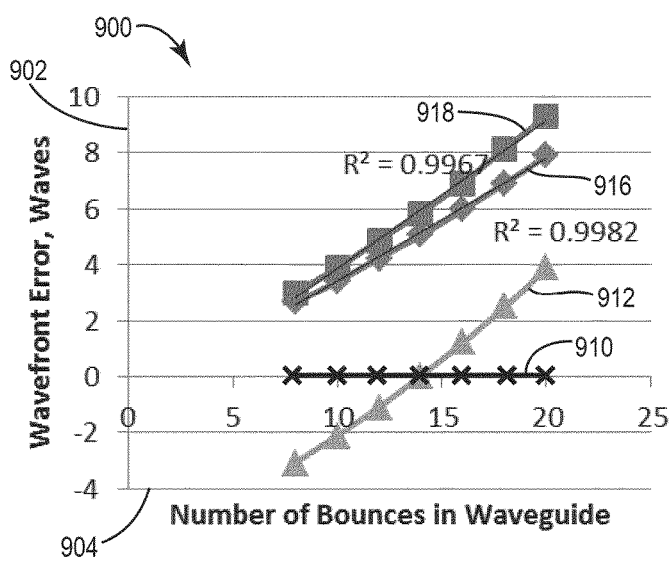
FIG. 9 is a chart showing wavefront error versus number of bounces according to certain criteria for an embodiment of the curved substrate waveguide combiner illustrated in FIGS. 1-3 in accordance with another exemplary embodiment.

With reference to FIG. 9, a chart 900 shows wavefront errors versus number of bounces for light traveling along a cylindrical or curved substrate waveguide combiner 40 according to certain criteria. Y axis 902 of chart 900 represents wavefront error in units of waves, and an X axis 904 of chart 900 represents the number of bounces as light travels down curved substrate waveguide combiner 40. It is noted that the wavefront error is linear with the number of bounces to a good approximation in one or more embodiments.

A line 916 shows the wavefront error along a central ray when light without any pre-aberration is provided to curved substrate waveguide combiner 40. A line 918 shows wavefront error along a ray angled at 10 degrees to the right of center when light without any pre-aberration is passed to curved substrate waveguide combiner 40. It is noted that, as above, the wavefront error is linear with the number of bounces to a good approximation in one or more embodiments.

A line 912 shows the wavefront error when light is provided to curved substrate waveguide combiner 40 using a cylindrical lens in optics 30 to pre-aberrate the image. In one or more embodiments, the cylindrical lens allows the wavefront error to be minimized at any point along the curved substrate waveguide combiner but will be non-optimal away from that point.

A line 910 shows wavefront error of approximately 0 when pre-aberrated light is provided to curved substrate waveguide combiner 40 across both vertical and horizontal fields of views by using an anamorphic asymmetric lens design in optics 30. The pre-aberration is configured in accordance with the inverse of characteristics of curved substrate waveguide combiner 40.

Although the images provided using a cylindrical lens in optics 30 without other pre-aberration can provide a quality image, the loss of the modulation transfer function can be unacceptable in certain applications and embodiments. Optics 30 can be designed to have varying amounts of cylindrical aberration (astigmatism) across the field by using more complex field flattener designs including wedge elements, aspheric elements, tilted elements, etc. Optical elements and design techniques used to correct strong aberrations induced by spherical off-axis combiners can be utilized in the design of optics 30 to correct for aberrations induced by curved substitute waveguide combiner 40. Applicants believe that with the appropriate geometry, a high quality collimated image with a singly-curved cylindrical waveguide, such as, curved substrate waveguide combiner 40, can be achieved.

Figure 10:
FIG. 10 is a perspective schematic drawing of an embodiment of the curved substrate waveguide combiner illustrated in FIGS. 1-3 for use with a helmet in accordance with another exemplary embodiment.
Figure 11:
FIG. 11 is a perspective schematic drawing of an embodiment of the curved substrate waveguide combiner illustrated in FIGS. 1-3 for use with a pair of goggles in accordance with another exemplary embodiment.

With reference to FIG. 10, curved substrate waveguide combiner 40 is employed as a visor in a helmet 1000. With reference to FIG. 11, curved substrate waveguide combiner 40 is employed as lens in a pair of goggles 1100.

Figure 12:
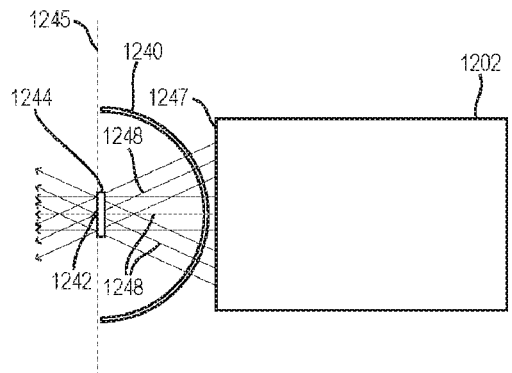
FIG. 12 is a top view schematic illustration of a HMD system including a curved substrate waveguide combiner and using a projected pupil in accordance with yet another exemplary embodiment.
Figure 13:
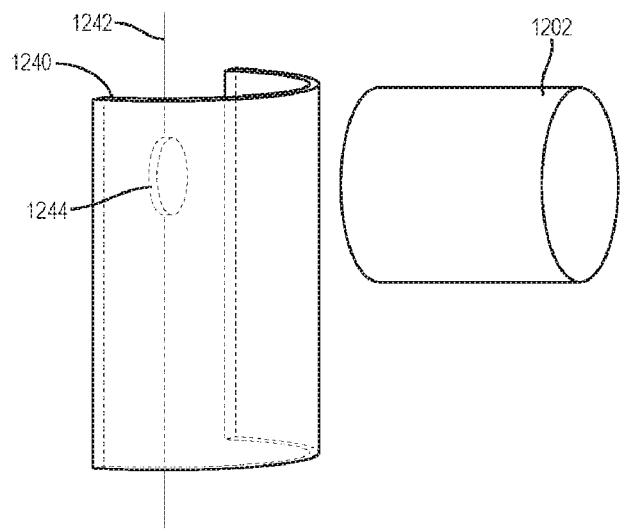
FIG. 13 is a perspective view schematic illustration of the HMD system illustrated in FIG. 12 in accordance with yet another exemplary embodiment.

With reference to FIGS. 12 and 13, an HMD system 1200 can utilize a projected pupil to reduce wavefront errors. The principles associated with HMD system 1200 can be utilized with system 10 illustrated in FIGS. 1-3 without departing from the scope of the invention.

HMD system 10 includes a projector 1202 and a curved waveguide combiner 1240. Light can enter curved waveguide combiner 1240 from projector 1202 according to the principles and structures discussed above with respect to system 10 illustrated in FIGS. 1-3. Light can exit curved waveguide combiner 1240 to a user according to the principles and structures discussed above with respect to system 10 illustrated in FIGS. 1-3. Projector 1202 is a large diameter collimator in one or more embodiments. Curved waveguide 1240 is a cylindrical combiner curved about an axis 1242 in one or more embodiments. Although a cylindrical shape is shown in FIGS. 12 and 13, curved waveguide combiner 1240 can have other shapes including elliptical shapes according to one or more embodiments.

Projector 1202 and curved waveguide combiner 1240 are advantageously configured to provide a projected pupil 1244 in one or more embodiments. Projected pupil 1244 is a small diameter projected pupil in one or more embodiments. Projector 1202 can be embodied as a compact collimating optical system with projected pupil 1244 tailored to the geometry and design of curved waveguide combiner 1240. In one or more embodiments, projector 1202 and curved waveguide combiner 1240 provide projected pupil 1244 to an imaginary stop located at the center of the cylinder associated with curved waveguide 1240 (e.g., in a plane 1245 containing axis 1242 and equidistant from a front surface 1247 of projector 1202). In one or more embodiments, chief rays 1248 of all pupils are on axis and the wavefront error depends almost solely on distance along curved waveguide 1240 (e.g., the dependence on field angle is substantially eliminated). In one or more embodiments, projected pupil 1244 is in a line with the axis of the collimating optical system (projector 1202). In one or more embodiments, projected pupil is incident on the input coupler part of curved waveguide combiner 1240 and focused on axis 1242.

Pre-aberrating the light with a cylindrical lens in projector 1202 can correct for loss of collimation at the center of the eye box for any one position along curved waveguide combiner 1240, and the use of projected pupil 1244 forces chief rays 1248 to intersect the cylinder axis 1242, greatly reducing the complexity of system 1200. In an embodiment where the fully corrected location is half way down curved waveguide 1240 (i.e., at the center of the field of view), the worst-case wavefront error at the top and bottom of the selected waveguide is on the order of 2-3 waves in one or more embodiments. In simulation, the loss of resolution of the image assuming 2 waves and 3 waves of error over the entire image provided a loss of collimation cannot simply be neglected in certain embodiments and applications. In simulation, the image had good quality considering curved waveguide combiner 1240 is curved, but the loss of modulation transfer function can be unacceptable in certain applications.

In one or more embodiments, location of the zero-error point can be achieved by changing the pre-aberration in projector 1202. Since each field has a unique aberration at the exit pupil, chief rays 1248 for all fields can be corrected using an asymmetric field lens system within the projector 1202. Projector 1202 is designed to have varying amounts of cylindrical aberration (astigmatism) across the field by using a more complex field flattener design (e.g, wedge, aspheric, tilted, etc.) in one or more embodiments. The amount of blurring over the exit pupil for any given field is only a small fraction of a wave in one or more embodiments and with the right geometry, a high quality collimated image with a singly-curved cylindrical waveguide 1240 can be produced according to one or more embodiments.

In one embodiment, switched Bragg grating (SBG) cells made with willow glass can be used in curved waveguide combiner 1240. SBG cells are generally flexible enough to lay over a mandrel and bend to the desired shape, as long as the radius of curvature is not too severe according to one or more embodiments.

In embodiments where HMD systems 10 and 1200 are HUD systems, curved substrate waveguide combiners 40 and 1240 can be a fixed combiner disposed in the environment of operation (e.g., as described in the patents incorporated herein by reference). In embodiments where HMD systems 10 and 1200 are collimated virtual windows, curved substrate waveguide combiners 40 and 1240 can be a fixed combiner disposed as a window or other structure in the environment of operation. Curved substrate waveguide combiners 40 and 1240 are disposed in or as a windshield of any type of vehicle (e.g., military, naval, marine, land-based, avionic) in one embodiment.

It is understood that while the detailed thicknesses, dimensions, and particular values given provide a preferred exemplary embodiment of the present invention, the preferred exemplary embodiment is for the purpose of illustration only. The method and apparatus of the invention is not limited to the precise details and conditions disclosed. For example, although specific types of optical component, dimensions and angles are mentioned, other components, dimensions and angles can be utilized. Various changes may be made to the details disclosed without departing from the spirit of the invention which is defined by the following claim.

What is claimed is:

1. A head-mounted or helmet-mounted display (HMD) for use with an image source, the HMD comprising:
    an asymmetric projector; and
    a curved substrate waveguide optically coupled to the asymmetric projector and positioned as a combiner such that light from the asymmetric projector enters the curved substrate waveguide, propagates by total internal reflection along the curved substrate waveguide in a direction substantially parallel to a single vertical axis of the curved substrate waveguide, and exits the curved substrate waveguide as collimated light toward a user, the curved substrate waveguide having an inside surface curved about the single vertical axis at a first fixed radius and an outside surface curved about the single vertical axis at a second fixed radius, wherein the single vertical axis is the axis of curvature for both the inside surface and the outside surface; and
    wherein the asymmetric projector is configured to pre-aberrate the light to reduce a wavefront error due to a curved shape of the curved substrate waveguide.

2. The HMD of claim 1, wherein the HMD provides a projected pupil, the projected pupil is provided to an imaginary stop in a plane including the single vertical axis and being equidistant from a front surface of the asymmetric projector.

3. The HMD of claim 1, wherein the asymmetric projector comprises a micro liquid crystal display.

4. The HMD of claim 1, wherein the curved substrate waveguide is symmetric about eye positions.

5. The HMD of claim 1, wherein the light travels by total internal reflection in the curved substrate waveguide substantially parallel to the single vertical axis from a top to a bottom.

6. The HMD of claim 1, wherein light from the asymmetric projector enters from a top or bottom edge of the curved substrate waveguide and leaves the curved substrate waveguide on the inside surface of the curved substrate waveguide.

7. The HMD of claim 1, wherein the asymmetric projector includes an anamorphic lens.

8. The HMD of claim 1, wherein the wavefront error is reduced to substantially zero across a vertical and horizontal field of view.

9. The HMD of claim 1, wherein the light is input into the curved substrate waveguide via diffraction.

10. A method of providing information to a user using a head-mounted or helmet-mounted display, a head up display, or collimated virtual display system, the method comprising:
    providing pre-aberrated light to a curved substrate waveguide combiner, the curved substrate waveguide combiner having an inside surface curved about the single vertical axis at a first fixed radius and an outside surface curved about the single vertical axis at a second fixed radius, wherein the single vertical axis is the axis of curvature for both the inside surface and the outside surface, wherein the curved substrate waveguide combiner has an input and an output and is optically coupled to an asymmetric projector configured to provide the pre-aberrated light to the input such that the pre-aberrated light from the asymmetric projector enters the curved substrate waveguide;
    providing the pre-aberrated light from the input of the curved substrate waveguide combiner to the output of the curved substrate waveguide combiner, wherein the pre-aberrated light propagates by total internal reflection along the curved substrate waveguide combiner in a direction substantially parallel to the single vertical axis of the curved substrate waveguide combiner; and
    ejecting light from the curved substrate waveguide combiner at the output of the curved substrate waveguide combiner as collimated light toward the user with reduced wavefront error due to the use of the pre-aberrated light.

11. The method of claim 10, wherein the wavefront error is a function of a number of bounces in the curved substrate waveguide combiner.

12. The method of claim 10, wherein the curved substrate waveguide combiner is cylindrically curved.

13. The method of claim 10, wherein the input and output are diffractive.

14. The method of claim 10, wherein the pre-aberrated light is pre-aberrated according to a two dimensional function.

15. A head-mounted or helmet-mounted display, a head up display, or collimated virtual display system, comprising:
a curved waveguide combiner having an input grating and an output grating, wherein light travels by total internal reflection from a top to a bottom of the curved waveguide combiner in a direction substantially parallel to a single vertical axis, the curved waveguide combiner is curved about the single vertical axis and provides collimated light at the output grating, the curved waveguide combiner having an inside surface curved about the single vertical axis at a first fixed radius and an outside surface curved about the single vertical axis at a second fixed radius, wherein the single vertical axis is the axis of curvature for both the inside surface and the outside surface, wherein the curved waveguide combiner is configured such that the light enters the curved waveguide combiner at the input grating and propagates by total internal reflection along the curved waveguide combiner in a direction substantially parallel to the single vertical axis of the curved waveguide combiner, and exits the curved waveguide combiner at the output grating as collimated light toward a user; and
an asymmetric optical system optically coupled to the curved waveguide combiner and providing the light to the input grating, wherein the asymmetric optical system is configured to reduce wavefront errors associated with the curved waveguide combiner.

16. The system of claim 15, wherein the wavefront errors are a function of a number of bounces in the curve waveguide combiner.

17. The system of claim 15, wherein the asymmetric optical system is pre-aberrated across the vertical and horizontal field of view of the curved waveguide combiner.

18. The system of claim 15, wherein the asymmetric optical system comprises an anamorphic lens.

19. The system of claim 15 wherein the curved waveguide combiner is a face shield.

20. The system of claim 15 wherein the curved waveguide combiner is a face shield.

\* \* \* \* \*